UNITED STATES PATENT OFFICE.

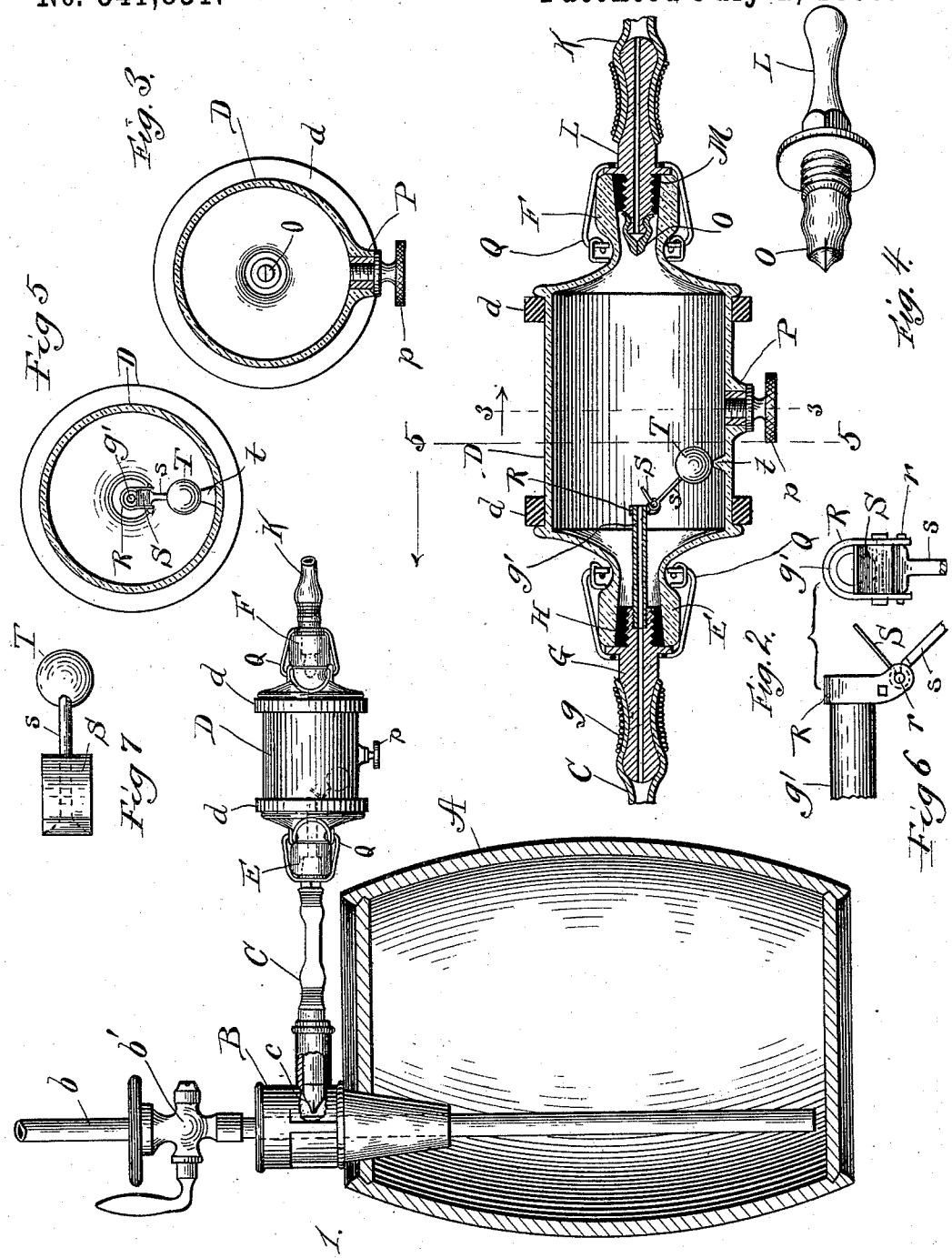

JOHN FREDRICK BEYERLEIN, OF CHICAGO, ILLINOIS.

BEER-PUMP ATTACHMENT.

SPECIFICATION forming part of Letters Patent No. 541,831, dated July 2, 1895.

Application filed April 9, 1895. Serial No. 545,077. (No model.)

*To all whom it may concern:*

Be it known that I, JOHN FREDRICK BEYERLEIN, a citizen of the United States, residing at Chicago, in the county of Cook and State of Illinois, have invented certain new and useful Improvements in Beer-Pump Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to means of connection between a source of air pressure and the beer barrel, its object being to prevent the fouling of such connection by the beer and froth settling back into it from the beer barrel, as well as to eliminate from the air any dust which it may contain.

The invention consists essentially of a trap of peculiar form introduced into such connecting pipe, and of the various details of construction hereinafter fully pointed out.

Beer is commonly drawn by forcing air into the barrel by means of an air pump. The pipe leading from the pump to the barrel usually terminates in a self-closing nipple, being a rubber cap having a slit cut in it which is normally closed. If this nipple becomes damaged or for any reason the slit does not remain tightly closed when the pressure from the air pump is relieved, beer, or at least the froth from the beer, will be forced back into the air pipe and will leave therein a deposit which soon becomes sour and taints the entire contents of the barrel, spoiling its flavor and indeed rendering it positively unwholesome.

My improved trap is designed to catch and retain any beer or froth which may find its way back into the air pipe, and being of glass it at once indicates any defect in the nipple at the end of the air pipe by exposing any liquid contents of the pipe to view. The trap is provided with a vent so that the air pressure may be utilized to expel any liquid which may accumulate in it.

In the accompanying drawings, I show in Figure 1, a longitudinal, central section of a beer barrel in connection with the system of pipes for emptying it; Fig. 2, a central, longitudinal section of my improved trap; Fig. 3, a transverse section on the line 3 3 of Fig. 2; Fig. 4, a perspective of the induction nipple in the trap. Figs. 5, 6, and 7 are details upon differing scales of the valve controlling the eduction pipe of the trap.

The beer barrel is represented at A, and the tapping plug at B; an eduction pipe $b$, leading from the barrel through this plug and being provided with a stop cock $b'$. Air is forced into the barrel through the pipe C, which enters the plug B, laterally and terminates within it in the self-closing nipple $c$.

The parts thus far described are all old and form no part of this invention.

My improved trap D, is shown as a glass cylinder having at each of its ends open necks E, F. The trap may be provided with soft protecting bands $d$, preferably of rubber, rendering it less liable to injury when not in use. The pipe C, is connected with the interior of the trap by means of a metal nipple G, upon which it is forced and to which it is secured by a wrapping cord or wire $g$. The nipple G, enters the neck E, through a tight fitting plug H, and is provided at its inner end with a short section of tubing $g'$, leading into the chamber of the trap. Upon the inner end of the tube $g'$, I fit a band R, having its ends projecting downwardly. A pin $r$, passing through these ends serves as a pivot for a flap valve S, adapted to close the orifice of the tube $g'$. The valve S, is provided with a laterally projecting stem S, at whose outer end is fixed a float T. When there is no liquid in the trap the float T, falls, opening the valve S, to allow the free passage of the air to the barrel. If liquid accumulates within the trap the float is carried up so that the valve S, closes the pipe $g'$, before the liquid is high enough to enter it, thereby preventing deleterious matter from being carried into the barrel.

As the sediment collecting in the trap may be viscid, and hold the float I prevent the latter from falling to the bottom of the trap by the use of a suitable stop, as the lug $t$, formed upon the inner surface of the trap. The valve R, is simply, made by flattening the wire forming the stem $s$, and bending it back, using the flat portion as the valve.

The trap D, is provided with a lateral neck P, closed by a removable plug p. In adjusting the trap for use the neck P, should be downward.

In use the air enters the chamber of the trap through the nipple O, and leaves it through the tube g', being delivered to the barrel A, through the nipple c, and the plug B. The desired pressure having been developed within the barrel the air pump is ordinarily stopped. The froth or foam of the beer will ordinarily fill the chamber of the plug B, as soon as the air pressure is cut off and if the nipple c, is not in perfect condition this froth will be forced back through it into the pipe C, by the pressure within the barrel and but for the trap D, would fill the air pipe back to the pump. The condensation of this foam will necessarily leave a deposit upon the walls of the pipe. The trap D, catches this foam and its presence is immediately revealed. The nipple O, stops the foam from passing beyond the trap and it may be at once driven from the trap by again applying pressure from the air pump and opening the vent P, or it may be allowed to condense and be blown out later as liquid.

I claim as my invention—

1. The combination with the air service pipe of a beer pump, of a trap comprising the chambered body D, the induction nipple L, having the back pressure valve O, and the eduction nipple G, having the float controlled valve S, substantially as described and for the purpose set forth.

2. The combination with the air service pipe of a beer pump, of a trap comprising the chambered body D, the induction nipple L, and the eduction nipple G, having the float controlled valve S, substantially as described and for the purpose set forth.

In testimony whereof I affix my signature in presence of two witnesses.

JOHN FREDRICK BEYERLEIN.

Witnesses:
LOUIS K. GILLSON,
E. E. BARTHOLOMEW.